(No Model.)
C. B. CROSBY.
CURRY COMB.
No. 370,047. Patented Sept. 20, 1887.
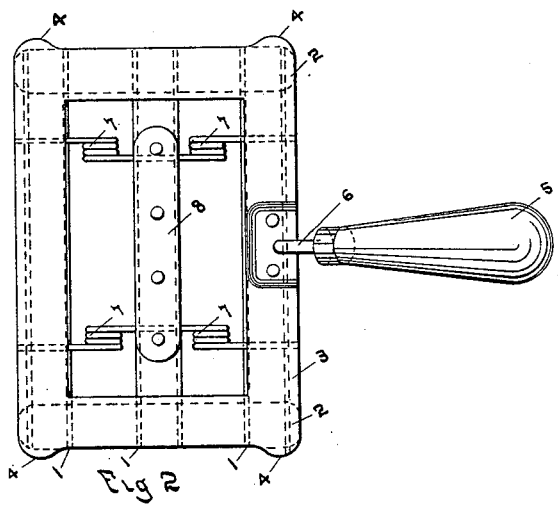
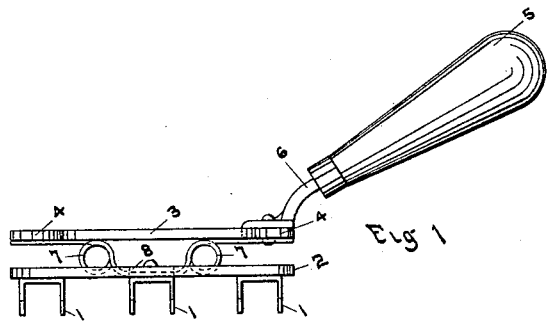

UNITED STATES PATENT OFFICE.

CHARLES B. CROSBY, OF FRANKFORT, NEW YORK.

CURRY-COMB.

SPECIFICATION forming part of Letters Patent No. 370,047, dated September 20, 1887.

Application filed June 27, 1887. Serial No. 242,585. (No model.)

*To all whom it may concern:*

Be it known that I, CHARLES B. CROSBY, of the village of Frankfort, in the county of Herkimer and State of New York, have invented certain new and useful Improvements in Curry-Combs; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improved curry-comb; and it consists in the mechanism hereinafter set forth, described, and claimed.

Heretofore the toothed portion of the curry-comb has been rigidly attached to the handle-piece, or the structure to which the handle has been attached, so that the toothed portion of the comb partook of every motion of the operator's hand. In cleaning certain parts of an animal great care had to be exercised in order to avoid wounding or scratching the skin, and often, in the case of a restive animal, the greatest care on the part of the operator could not avoid such a result.

The distinctive feature that marks the difference between my invention and the usual curry-comb is that I flexibly connect the toothed portion of the comb with the hand-piece or handle thereof in such manner that the toothed portion can follow and adjust itself to the varying contour of the animal, irrespective, to a certain extent, of the movement of the hand of the operator. In describing the mechanism used to attain this result reference will be made to the accompanying drawings, in which—

Figure 1 represents a side elevation of my invention, and Fig. 2 represents a plan view of the same.

Like figures of reference refer to like parts in the drawings presented.

1, Figs. 1 and 2, represents the ordinary metallic channel-shaped tooth-bars, that are appropriately toothed upon their free projecting edges.

2 represents metallic cross-pieces placed at each end of the tooth-bars and riveted, soldered, or otherwise attached thereto, and which serve to rigidly connect the tooth-bars together and hold them in proper relative position. The parts previously described—viz., the tooth-bars 1 and the cross-pieces 2—form what I term the "toothed portion" of my invention.

Located at a proper distance above the toothed portion of my device I provide what I term the "hand-piece." This consists of an approximately rectangular metallic open frame, 3. This frame corresponds practically in superficial dimensions to those of the toothed portion of my device, except at the corners, where it is provided with swells or projections, as shown at 4. In the use of a curry-comb it is customary to occasionally rap or strike it against some solid substance, to jar out the dirt that accumulates therein. Projections 4 are intended to contact the solid substance during this operation and prevent injury to the toothed portion of the device.

Hand-piece 3 is provided with an appropriate handle, 5, which, as shown in the drawings, consists of a wooden handle provided with a metallic shank, 6, having its outer or lower end expanded into a pad, which is riveted or soldered to the hand-piece 3. In order to obtain a flexible connection between the hand-piece and the toothed portion of my device, I provide coiled springs 7. I preferably form each spring of one piece of wire. That portion of the wire between the convolutions of the coils is shaped substantially as shown, and secured to the upper surface of the middle tooth-bar by the clip-plate 8, which is riveted or soldered thereto. Plate 8 may be dispensed with, and the wire soldered or otherwise fastened to the tooth-bar, if desired. The outer ends of the wire are shaped substantially as shown, and soldered, riveted, or otherwise fastened to the hand-piece 3.

It will be readily seen that the construction described above affords a flexible and yielding connection between the hand and toothed portions of the curry-comb, permits the same to adapt itself to the varying shape of the animal, lessens the chances of injury thereto, and affords greater ease of manipulation to the operator.

Modifications and changes in the construction of my device will readily suggest themselves to one skilled in the art to which it pertains, which changes can be made without departure from the central feature or spirit of my invention; hence I do not limit or confine the broad scope of my invention to the precise specific construction hereinbefore described and set forth.

What I claim as new, and desire to secure by Letters Patent, is—

The combination of the back, the frame having rigid teeth thereon, and the back and frame flexibly and elastically joined by springs, substantially as set forth.

In witness whereof I have affixed my signature in presence of two witnesses.

CHAS. B. CROSBY.

Witnesses:
W. G. STONE,
M. E. ROBINSON.